United States Patent
McCoy et al.

(10) Patent No.: US 6,296,215 B1
(45) Date of Patent: Oct. 2, 2001

(54) ADJUSTABLE KEYBOARD SUPPORT

(75) Inventors: Phillip McCoy, Albion; Donald E. DeWitt, Syracuse; Edward J. Keil, Rome City, all of IN (US); Tracy Tolar, Indian Rocks Beach, FL (US)

(73) Assignee: Group Dekko Services, LLC, Kendallville, IN (US)

( * ) Notice: Subject to any disclaimer, the term of this patent is extended or adjusted under 35 U.S.C. 154(b) by 0 days.

(21) Appl. No.: 09/464,030

(22) Filed: Dec. 15, 1999

(51) Int. Cl.[7] .................... A47B 57/00; B43L 15/00
(52) U.S. Cl. ................... 248/284.1; 248/118.3; 248/918
(58) Field of Search ............ 248/274.1, 276.1, 248/284.1, 286.1, 292.12, 292.13, 918, 118.3, 188.2, 292.11; 108/50.02, 94, 95, 96, 138; 312/208.1, 223.3; 16/307, 342; 400/715

(56) References Cited

U.S. PATENT DOCUMENTS

| | | | |
|---|---|---|---|
| 5,037,054 | 8/1991 | McConnell | 248/284 |
| 5,183,230 | * 2/1993 | Walker et al. | 248/118 |
| 5,230,289 | 7/1993 | George et al. | 108/2 |
| 5,257,767 | 11/1993 | McConnell | 248/284 |
| 5,354,028 | * 10/1994 | Kitamura | 248/292.11 |
| 5,443,237 | 8/1995 | Stadtmauer | 248/441.1 |
| 5,564,163 | * 10/1996 | Lowry et al. | 16/342 |
| 5,564,667 | 10/1996 | Copeland et al. | 248/278.1 |
| 5,653,413 | 8/1997 | Fink | 248/286.1 |
| 5,655,743 | 8/1997 | Gillis | 248/346.01 |
| 5,775,657 | 7/1998 | Hung | 248/289.11 |
| 5,791,263 | 8/1998 | Watt et al. | 108/138 |
| 5,823,487 | 10/1998 | Kirchhoff et al. | 248/118 |
| 5,832,840 | * 11/1998 | Woof | 108/6 |
| 5,836,560 | 11/1998 | Kaplan et al. | 248/286.1 |
| 5,878,674 | 3/1999 | Allan | 108/93 |
| 6,135,405 | * 10/2000 | Jones et al. | 248/284.1 |

* cited by examiner

Primary Examiner—Leslie A. Braun
Assistant Examiner—Jon Szumny
(74) Attorney, Agent, or Firm—Taylor & Aust, P.C.

(57) ABSTRACT

An adjustable keyboard support device having a keyboard support platform and an arm connected to the platform and adapted for attachment to a base unit. Positioning of the keyboard support platform is secured by frictional engagement of coil springs on cylindrical surfaces. Release mechanisms may be activated to change diameters of the coil springs, unsecuring the engagement of the springs against the surface. Varying spring constants allows progressive release of more than one spring. An adjustable peripheral device support platform is attached to the keyboard support platform. A wrist support is provided at the front of the keyboard support platform, and includes a rack and pinion adjustment of the height of the support surface.

26 Claims, 6 Drawing Sheets

ADJUSTABLE KEYBOARD SUPPORT

BACKGROUND OF THE INVENTION

1. Field of the Invention

The present invention relates to a support arm for a computer keyboard or the like.

2. Description of the Related Art

The use of computer workstations, personal computers and the like is becoming more and more prevalent in the workplace and the home. Even small business establishments often use computers for record keeping functions. Most clerical functions, in large businesses and in small businesses are performed on computers. Even workers who require a computer for only brief periods each day often have one at their workstation.

Often times, there is limited space available in a work area for positioning all necessary computer components. While the computer CPU, disk drives and the like can be positioned out of the way, under tables or along side desks, the monitor and keyboard must be conveniently located for ready operation and viewing. This may result in the monitor being placed on a desk, credenza or table for easy viewing, with the keyboard positioned directly in front of the monitor, on the same desk, credenza or table.

When not in use, a keyboard in front of a monitor occupies an area of work surface that otherwise could be used for other tasks. In a small office or work environment, available work surface area may be extremely limited. Therefore, it is advantageous to move the keyboard out of the way when not in use. Further, the height of a desk, credenza or table may be too high for comfortable operation of a keyboard placed thereon, and the limited depth of a desk, credenza or table top may result in the keyboard being too close to the monitor, making viewing uncomfortable. Therefore, it is advantageous if the keyboard can be moved downwardly, to a more comfortable position for operation.

Proper positioning of the keyboard is critical to the comfort of the user. Proper height and angular placement of the keyboard can increase productivity, lessen fatigue and decrease occurrence of repetitive motion injuries such as carpal tunnel syndrome. Additionally, it is advantageous to provide a supporting surface for the user's wrist. Proper support of the wrist can lessen arm fatigue and hand fatigue. Once properly positioned, both vertically and angularly, the keyboard should be fixed firmly in position, and should not be wobbly, or loose, and should not settle or rise.

Since most computer workstations also include the use of peripheral components, such as a computer mouse, digitizing pad or the like, it is advantageous to have a readily accessible, adjustable surface on which to place the peripheral device. The peripheral device should be conveniently located, at a height similar to the height of the keyboard, and near the keyboard, so a user can reach the peripheral device quickly and conveniently, without strain.

Many different types of keyboard supports are known. Rigid, non-adjustable surfaces have been used, but do not provide any of the fine adjustments necessary for comfortable use of the keyboard. Sliding shelves and trays are known, and can successfully move the keyboard out of the way when not in use, but also do not provide the necessary adjustment for comfortable use of the keyboard.

Many different types of articulating arms are also known. Some have provided multiple adjustments for height and angular orientation, but without convenient adjustability. Wing nuts, thumb screws, lever topped nuts and various other mechanisms are known for securing the position of support devices. Many are not convenient to use and do not secure the device adequately during use. Rotating a handle, lever or knob to tighten a nut is inconvenient. If not tightened adequately, the position may change during use, causing the keyboard to tip gradually, rise or fall. Some users may not be capable of tightening the device adequately, and others may over-tighten the mechanism, causing damage to the mechanism and making it difficult for others to loosen the mechanism. Further, the mere act of tightening the mechanism may cause the support to move from the desired position. After adjusting the device, and tightening as required, the user may find it is not positioned as desired.

To increase stability, fixed stops in the adjustment can be used. However, it is preferable that the height and angular orientation be infinitely variable between the extremes of positions, so that every user can find a comfortable adjustment. Fixed stops may not provide enough options for the preferences of all users.

Known wrist supports have taken the form of fixed pads placed in front of the keyboard, providing a certain amount of wrist support. However, adjustability of the wrist support has been limited. A wrist support fixed in position relative to the keyboard may not provide the same comfort to all users. Some users may hold their wrists high when using a keyboard, others may prefer a lower support for their wrists.

If different users will use the same keyboard, it is particularly advantageous that the keyboard support be finely adjustable in height and angular orientation, and that the position of a wrist support be likewise adjustable to a fine degree. It is also advantageous that adjustment be made quickly and easily without undue inconvenience to the user, thereby encouraging the user to make necessary adjustments, to increase comfort and minimize fatigue.

SUMMARY OF THE INVENTION

The present invention provides an adjustable support for keyboards or the like. A platform is provided for holding the keyboard. A peripheral support platform for a computer mouse, digitizing pad or the like is connected to the keyboard support. A support arm is attached at one end to the keyboard support platform and is adapted at the other end for attachment to a base unit, such as the underside of a desk surface, a table top or the like. Alternatively, attachment can be to modular furniture components.

In one form of the invention, a dual coil spring assembly is associated with the support arm at the connection of the support arm to the base unit, and includes a first coil spring and a second coil spring disposed around the outside diameter of a tube. One end of each coil spring is attached to a yoke, and the other end of each coil spring releasably holds the tube, by frictional engagement of the inside of the coil spring against the outside of the tube. A counterbalancing spring is provided inside the tube.

The keyboard support platform includes a dual coil spring assembly similar to the first dual coil spring assembly, at the connection of the keyboard support platform to the support arm. An adjustable wrist support rest, two release paddles and a linkage assembly including a pulley system and cables that link the release paddles to each of the dual coil spring assemblies are also provided. Either or both paddles may be activated, to move the yokes of the dual spring assemblies, thereby expanding the inside diameters of the springs and releasing the binding engagement of the springs on the tubes. By utilizing different spring constants in the dual spring assemblies, activation of each can be made to occur in series. Therefore, partial movement of the paddles will activate only one of the dual coil spring assemblies, and full activation of the paddles will release both dual coil spring assemblies. Height and angular orientation of the keyboard platform can be made through activation of the paddles to release the dual coil spring assemblies, and moving the keyboard support platform to the desired height and angular orientation. Upon releasing the paddles, the dual coil spring assemblies grasp the respective tubes about which the springs are wrapped, securing the keyboard support platform in the desired position.

In a second form of the invention, single coil springs are provided in each coil spring assembly. The coil springs frictionally engage fixed members of the support arm, and are attached to toggle wheels. Activation of the release paddles rotates the toggle wheels, turning the springs to release the frictional engagement between the springs and the fixed members of the support arm. Upon releasing the paddles, the toggle wheel is rotated to its original position, and the coil springs again engage the fixed members.

The wrist support includes a fixed lower housing attached to the keyboard support platform, and an upper housing connected to the lower housing through a rack and pinion adjustment mechanism. A thumbwheel disposed on a shaft carrying the pinion gears is used to rotate the pinion gears, raising and lower the racks attached to the upper housing. In this manner, the wrist rest can be raised or lowered relative to a keyboard disposed on the keyboard support platform. An anti-rotation shroud is provided to secure the wrist support adjustment mechanism in the established position.

An advantage of the present invention is the convenient adjustment of a keyboard support in height and angular orientation.

Another advantage of the present invention is providing a keyboard support device which is convenient and easy to use, with fine adjustment increments between extreme positions of adjustment.

Yet another advantage of the present invention is providing a keyboard support device which is easily adjustable yet securely locked in position once adjusted, and which can be operated with minimal inconvenience.

A further advantage of the present invention is providing a keyboard support device having a wrist support platform which is adjustable for comfort of the user.

A still further advantage of the present invention is providing an adjustable keyboard support device having a high degree of adjustability, ease and operation for both right-handed and left-handed users which rigidly locks in position once adjusted without strain or effort on the part of the user.

Yet another advantage of the present invention is providing an adjustable keyboard support having a peripheral component support platform adjustable in position relative to the keyboard support platform.

BRIEF DESCRIPTION OF THE DRAWINGS

The above-mentioned and other features and advantages of this invention, and the manner of attaining them, will become more apparent and the invention will be better understood by reference to the following description of an embodiment of the invention, and a modification thereof, taken in conjunction with the accompanying drawings, wherein.

Figure 1:
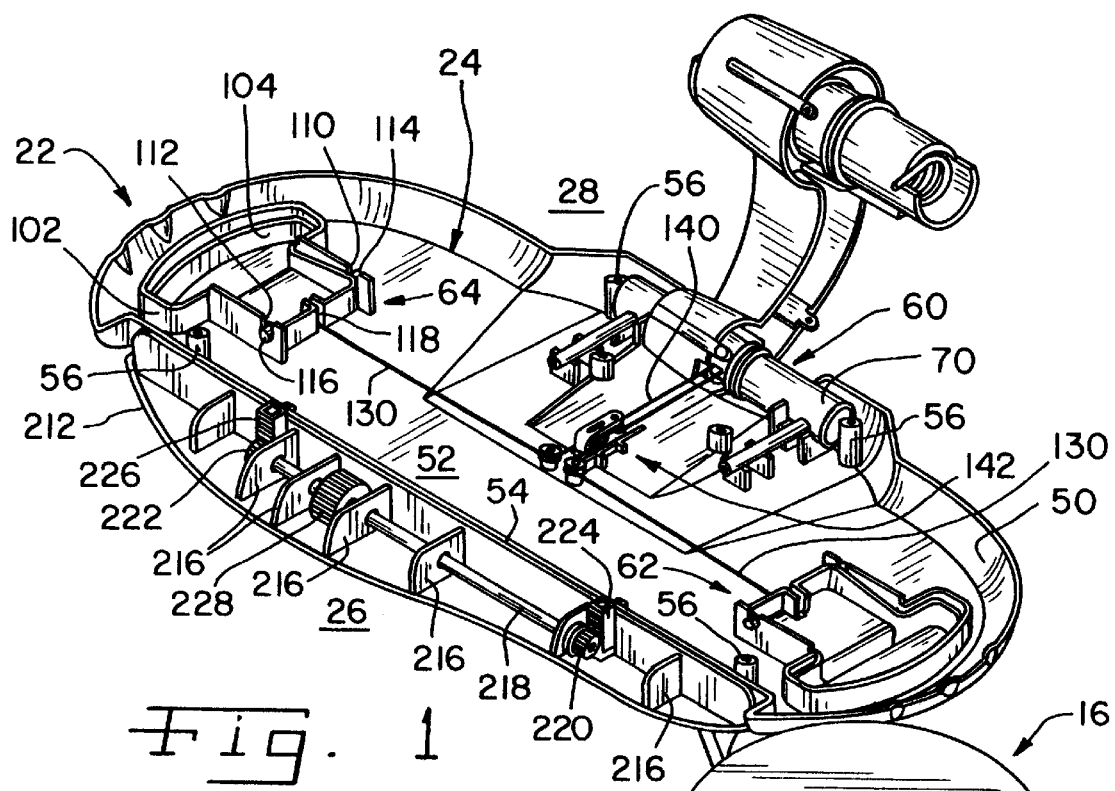
FIG. 1 is a perspective view of an adjustable keyboard support device of the present invention, with the p piece of the keyboard support platform being removed.

Corresponding reference characters indicate corresponding parts throughout the several views. The exemplification set out herein illustrates one preferred embodiment of the invention, in one form, and one modification thereof, and such exemplifications are not to be construed as limiting the scope of the invention in any manner.

DETAILED DESCRIPTION OF THE INVENTION

Referring now more specifically to the drawings, and to FIG. 1 in particular, numeral 10 designates an adjustable keyboard support device of the present invention. Support device 10 is configured for holding a computer keyboard and a peripheral component such as a computer mouse, a digitizing pad, or the like.

Figure 4:
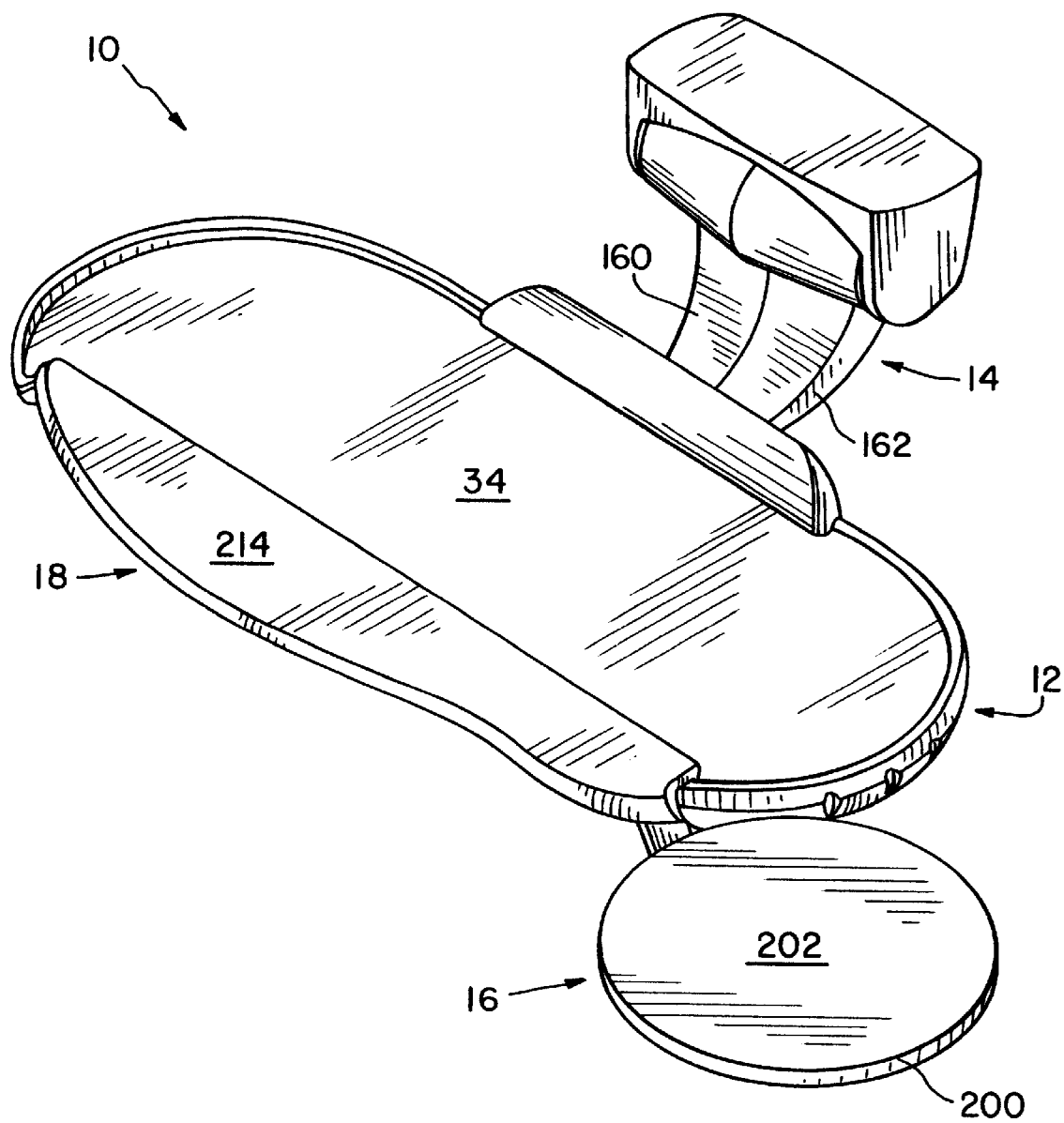
FIG. 4 is a perspective view of a fully assembled adjustable keyboard support device of the present invention.
Figure 5:
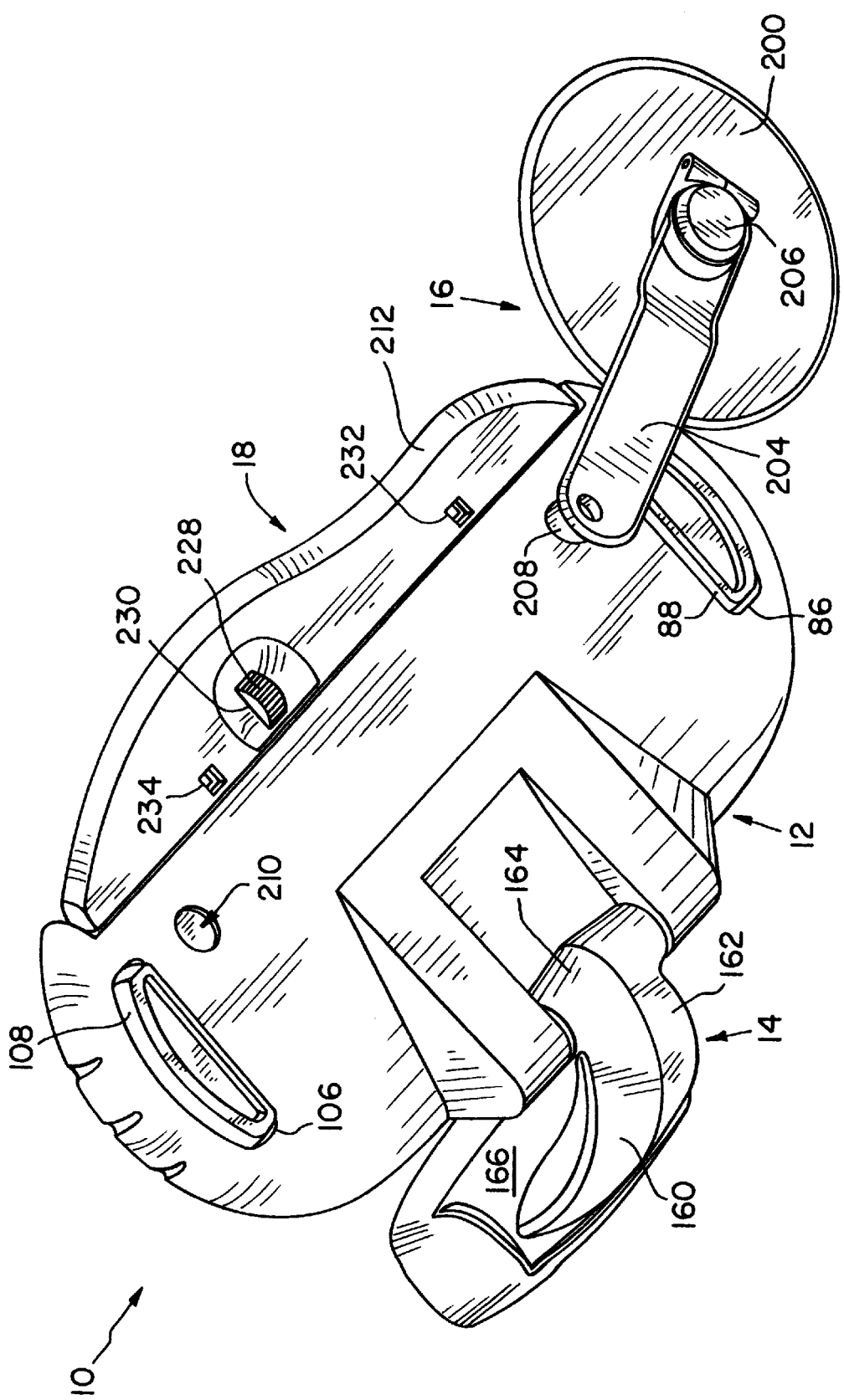
FIG. 5 is a perspective view of the bottom of the adjustable keyboard support device shown in FIG. 4.
Figure 6:
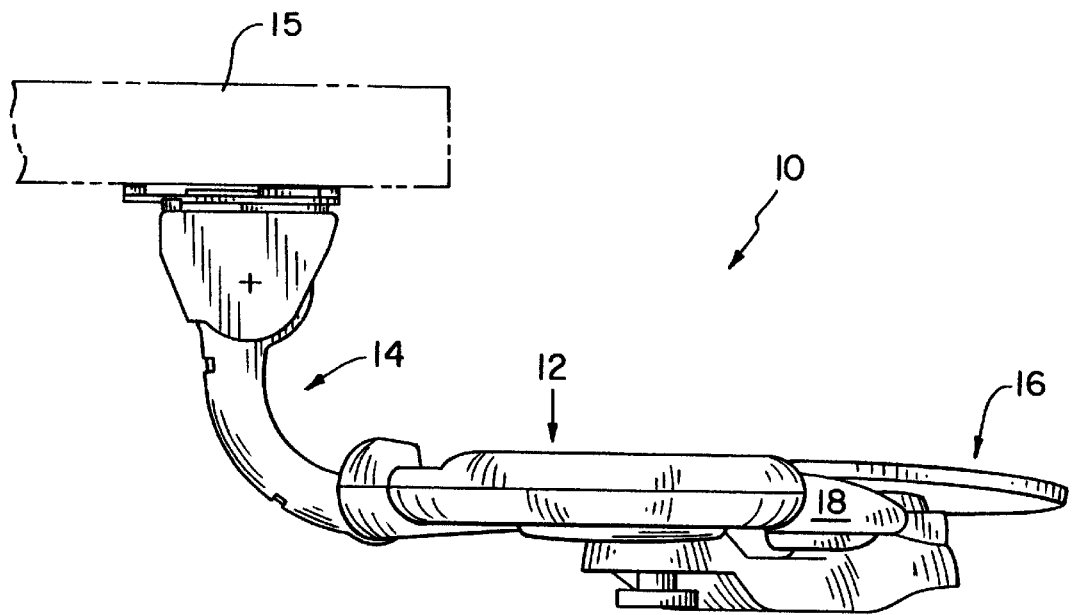
FIG. 6 is a side elevational view of the keyboard support device shown in the previous Figures.

As seen most clearly in the perspective views of FIG. 4, FIG. 5 and FIG. 6, keyboard support device 10 includes, generally, a keyboard support platform 12 adapted for holding a keyboard. A support arm 14 is disposed between keyboard support platform 12 and a base unit 15, such as a counter, table, desk or other body to which the keyboard support device is attached. To support peripheral devices, such as a computer mouse, a mouse platform 16 is provided, connected to keyboard support platform 12. A wrist rest unit 18 is operatively disposed at the front edge of keyboard support platform 12.

Keyboard support platform 12 includes an upper body piece 20 (FIG. 2) and a lower body piece 22 (FIG. 1), of complimentary shape to define an internal cavity 24. Each of upper body piece 20 and lower body piece 22 has a user side 26, and an attachment side 28. References hereinafter with respect to terms such as "front", "back", "left" and "right" shall be made from the perspective of a user positioned with user side 26 being the side nearest the user, and attachment side 28 being farthest from the user.

Figure 2:
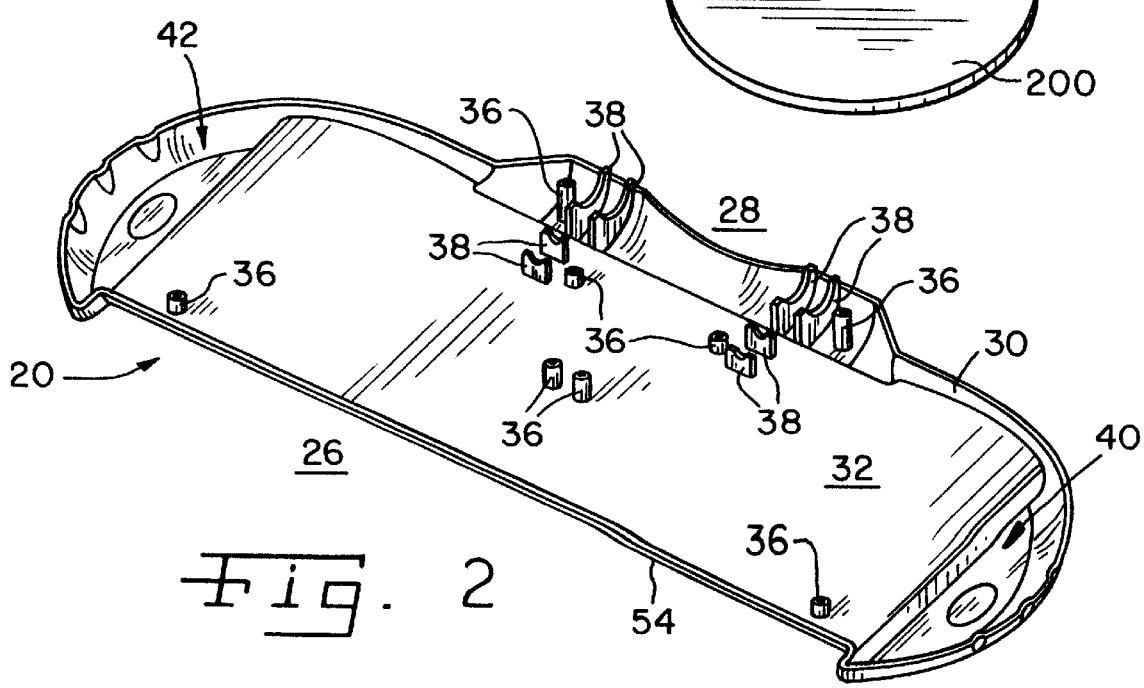
FIG. 2 is a perspective view of the underside of the top piece of the keyboard support platform.

Upper body piece 20, which is shown inverted in FIG. 2, includes an outer wall 30 and a central plate 32 having a substantially flat surface 34 (FIG. 4) on which a keyboard may be placed. The underside of central plate 32 includes a plurality of stand offs 36 and/or positioners 38 useful in mating the upper body piece 20 to the lower body piece 22 when assembled. Stand offs 36 and positioners 38 are designed to partially engage (positioners 38) other components of keyboard support platform 12 or mate with (stand offs 36) similar components of the lower body piece 22. In securing the upper body piece 20 to the lower body piece 22, one or more of stand offs 36 or positioners 38 may be threaded to receive screws, not shown, extended upwardly through the lower body piece 22. Lateral portions of outer wall 30 curve outwardly to define pockets 40 and 42 outwardly of central plate 32, on a first and second side, respectively, of keyboard support platform 12.

Referring again to FIG. 1, lower body piece 22 includes an outer wall 50 shaped complimentary to outer wall 30 of upper body piece 20. A floor 52 is disposed within outer wall 50. Outer walls 30 and 50, central plate 32 and floor 52, when assembled, define cavity 24. Upper body piece 20 and lower body piece 22, as assembled, define a front edge 54 along which wrist rest unit 18 is operable. A plurality of stand offs 56 and positioners 58 are disposed on floor 52 of lower body piece 22. One or more of stand offs 56 may define central openings therethrough, through which screws or the like (not shown) may be extended to be receivingly engaged by complimentary stand offs 36 of upper body piece 20. Together with positioners 38 of upper body piece 20, positioners 58 of lower body piece 22 are located to engage components of the keyboard support platform to be described subsequently.

Disposed within cavity 24, between upper body piece 20 and lower body piece 22, are a locking pivotal assembly 60 and first and second release mechanisms 62 and 64, respectively. Locking pivotal assembly 60 is the connecting structure between keyboard support platform 12 and support arm 14. When released, locking pivotal assembly 60 allows relative rotational movement between keyboard support platform 12 and support arm 14. When not released, locking pivotal assembly 60 automatically secures the relative positions of keyboard support platform 12 and support arm 14, and, under normal conditions, prevents relative rotational movement therebetween. Release mechanisms 62 and 64 are used to release locking pivotal assembly 60, to allow relative rotational movement between keyboard support platform 12 and support arm 14.

Figure 3:
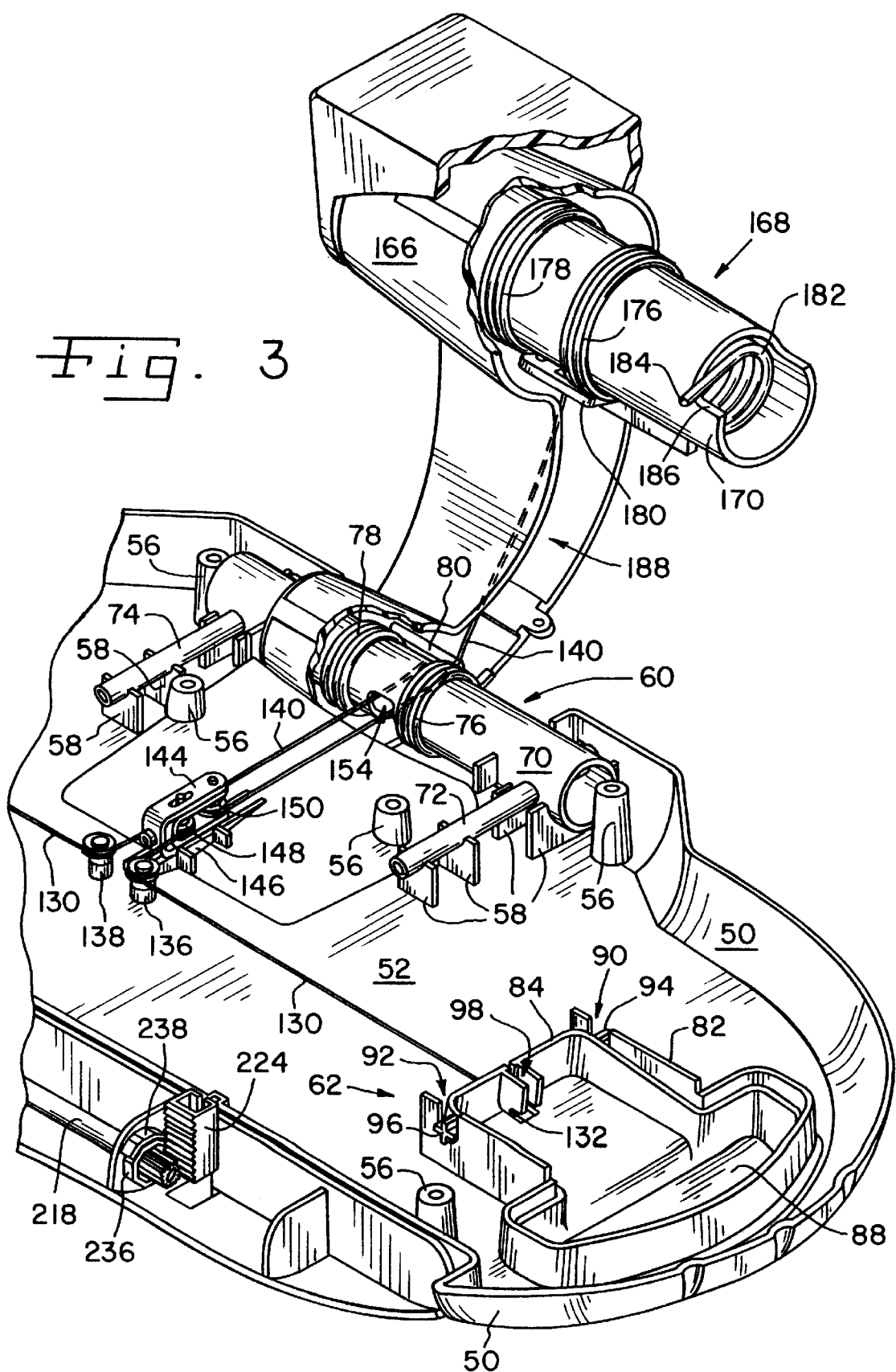
FIG. 3 is an enlarged, fragmentary view of the adjustable keyboard support device shown in FIG. 1.

Locking pivotal assembly, 60 shown most clearly in the enlarged view of FIG. 3, includes a tube 70 having first and second arms 72 and 74 received between complimentary positioners 38 and 58 of upper body piece 20 and lower body piece 22, respectively. Tube 70 is rotatably received in support arm 14, and is positioned against lateral movement between stand offs 36 and 56 of upper body piece 20 and lower body piece 22, respectively. Thus, tube 70 is fixed within cavity 24, but may rotate relative to support arm 14. A first outer coil spring 76 and a second outer coil spring 78 are disposed around tube 70. In the relaxed positions of first outer coil spring 76 and second outer coil spring 78, the inner diameters (i.d.) of each is less than the outer diameter (o.d.) of tube 70, such that, when assembled on tube 70, neither coil spring 76 nor coil spring 78 can fully relax. Each coil spring 76 and coil spring 78 instead engages the outer surface of tube 70 in a tightly gripped manner such that, without excessive force, tube 70 will not rotate within first outer coil spring 76 or second outer coil spring 78. One end of first outer coil spring 76 is attached to tube 70 and the second end of first outer coil spring 76 is attached to a yoke 80. Similarly, one end of second outer coil spring 78 is attached to tube 70 and the other end of second outer coil spring 78 is attached to yoke 80. Yoke 80 is shown in enlarged view in FIG. 7, and will be described in greater detail hereinafter.

First release mechanism 62 includes a shaped housing 82 extending upwardly from floor 52. A release paddle 84 is a body shaped to fit within housing 82, while moving upwardly and downwardly therein, in a manner to be described. Within the confines of housing 82 floor 52 defines an opening 86 (FIG. 5). A finger tab 88 of release paddle 84 extends downwardly through opening 86. At the inner ends of housing 82, slots 90 and 92 are defined for receiving pivots 94 and 96 of release paddle 84. Thus, finger tab 88 and the outer end of release paddle 84 can move upwardly and downwardly, pivoting on the pivots 94 and 96 in slots 90 and 92. The inner edge of release paddle 84 defines a cable slot 98.

Second release mechanism 64 (FIG. 1) is similar to first release mechanism 62, and includes a shaped housing 102 extending upwardly from floor 52. A release paddle 104 is a body shaped to fit within housing 102. Within the confines of housing 102, floor 52 defines an opening 106 (FIG. 5). A finger tab 108 of release paddle 104 extends downwardly through opening 106. At the inner ends of housing 102, slots 110 and 112 are defined for receiving pivots 114 and 116 of release paddle 104. Thus, finger tab 108 and the outer end of release paddle 104 can move upwardly and downwardly, pivoting on pivots 114 and 116 in slots 110 and 112. The inner edge of release paddle 104 defines a cable slot 118.

Figure 7:
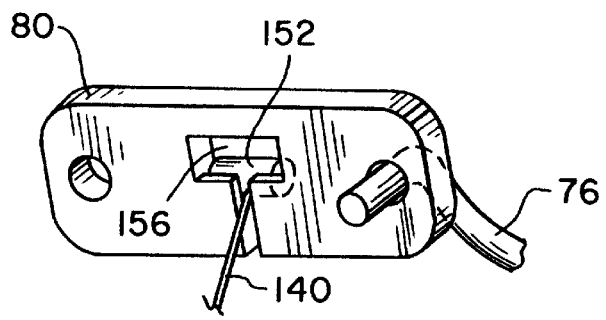
FIG. 7 is an enlarged, perspective view of a yoke, cable and spring assembly of the keyboard support device shown in the previous Figures.

A first cable 130 is disposed between first release mechanism 62 and second release mechanism 64. A first cable retainer 132 is attached to one end of cable 130, for securing cable 130 in slot 98 of first release mechanisms 62. A second cable retainer (not shown) secures the opposite end of cable 130 in slot 118. First and second capstans 136 and 138 are disposed inwardly from first and second release mechanisms 62 and 64, respectively. Cable 130 extends from release mechanisms 62 and 64 on the side of capstans 136 and 138 toward front edge 54, and forms a loop between capstans 136 and 138 extending toward support arm 14. A second cable 140 is attached to yoke 80, and forms a loop extending toward the loop of cable 130. A cable link 142 interconnects the looped portions of cable 130 and cable 140. A U-shaped bracket 144 is disposed within a slide 146 on floor 52. First and second pulleys 148 and 150, respectively, are disposed in bracket 144. Pulley 148 and pulley 150 are each rotational about vertical axes relative to floor 52. The looped portion of cable 130 is disposed around pulley 148. One end of cable 140 is attached to yoke 80 by a cable retainer 152 (FIG. 7). The looped portion of cable 140 extends through an opening 154 in tube 70 and is disposed about pulley 150. The remaining length of cable 140 passes through an opening 156 in yoke 80, and extends through support arm 14, for attachment thereto as will be described hereinafter.

Support arm 14 includes a first housing member 160 and a second housing member 162. An enlarged lower portion 164 defined by first housing member 160 and second housing member 162 encloses locking pivotal assembly 60 described previously. An enlarged upper portion 166 defined by housing members 160 and 162 encloses a second locking pivotal assembly 168.

Second locking pivotal assembly 168 includes a tube 170 rotatably received in support arm 14. A first outer coil spring 176 and a second outer coil spring 178 are disposed around tube 170. In the relaxed positions of first outer coil spring 176 and second outer coil spring 178, the inner diameters of each is less than the outer diameter of tube 170, such that, when assembled on tube 170 neither coil spring 176 nor coil spring 178 can fully relax. Each coil spring 176 and coil spring 178 instead engages the outer surface of tube 170 in a tightly gripped manner such that without excessive force, tube 170 will not rotate within first outer coil spring 176 or second outer coil spring 178. One end of first outer coil spring 176 is attached to tube 170 and the second end of first outer coil spring 176 is attached to a yoke 180. Similarly, one end of second outer coil spring 178 is attached to tube 170 and the other end of second outer coil spring 178 is attached to yoke 180. Yoke 180 is similar to yoke 80, described previously.

A counterbalance spring 182 is disposed around the inside diameter of tube 170. An end 184 of counterbalance spring 182 is attached to tube 170 by receipt against a shoulder 186 formed in tube 170.

A hollow space 188 is defined within housing members 160 and 162. The end of cable 140 extending through opening 156 of yoke 80 extends through hollow space 188, and is connected to yoke 180.

Referring now to FIG. 5, mouse platform 16 includes a substantially round body 200 defining an upper surface 202 (FIG. 4) on which a computer mouse may be operated. Surface 202 may have suitable surface treatment to provide a rough or textured surface for improved operation of a computer mouse. Alternatively, surface 202 may be adapted for receipt of a computer mouse pad or other similar unit upon which a computer mouse is effectively operated. Body 200 may be of shapes other than round, and may be specifically adapted and sized for holding peripheral devices other than a computer mouse. An arm 204 connects body 200 to floor 52. In a preferred arrangement, arm 204 and body 200 are adapted for sliding engagement, and a retainer screw 206 is provided for securing body 200 on arm 204. This will allow removal of body 200, and replacement with a body of different shape, for a different purpose, if desired. A ball and socket joint 208, or other similar pivotal rotational attachment unit connects arm 204 to floor 52. An opening 210 is provided in floor 52 for attaching arm 204 to the opposite side of floor 52. Thus, the present invention may be modified for operation and use by individuals using either their right hand or their left hand for operating a computer mouse.

Wrist rest unit 18 is connected to keyboard support platform 12 along front edge 54. A lower body 212 of wrist rest unit 18 (FIG. 1) is attached at front edge 54. An upper body 214 is vertically adjustable relative to lower body 212. An outer surface of upper body 214 is the surface upon which a keyboard operator may rest his or her wrist or forearm during use of a keyboard disposed on keyboard support platform 12. A plurality of walls 216 are disposed in lower body 212, and retain a shaft 218 for rotation about a horizontal axis of shaft 218. Pinion gears 220 and 222 are disposed at opposite ends of shaft 218. Vertical racks 224 and 226 are provided, connected to upper body 214. A thumb wheel 228 is disposed on shaft 218 and extends through an opening 230 (FIG. 5) at the bottom of lower body 212. Depending upon the direction of rotational operation of thumb wheel 228, pinion gears 220 and 222 cause racks 224 and 226 to move upwardly or downwardly. Slots 232 and 234 in lower body 212 allow the lower ends of racks 224 and 226 to extend therethrough, if wrist support positioning is very low. To prevent downward creep of racks 224 and 226, shaft 218 includes a shaped head 236, which may be simply a six or eight sided boss on the shaft. An anti-rotation shroud 238 engages several of the sides of head 236 when positioned thereover. In FIG. 1 and FIG. 3, for illustration and explanation purposes, racks 224 and 226 and anti-rotation shroud 238 are shown in operative position relative to lower body 212. Normally, racks 224 and 226, and anti-rotation shroud 238 will be attached to, or an integral part of upper body 214.

In the use and operation of an adjustable keyboard support device according to the present invention, a keyboard or similar device is placed on surface 34. To adjust the relative height and/or angular position of the keyboard, first release mechanism 62, and/or second release mechanism 64 is operated by pushing upwardly on release paddle 84 or release paddle 104. Upward movement of either paddle, or both, causes the activated paddle to pivot about pivots 92 and 94, or 114 and 116. Movement in this manner causes the inner edge of the paddle to tilt, thereby causing some dislocation of cable 130 and a shortening in the length of the loop in cable 130 between capstans 136 and 138. Through the interconnection of cables 130 and 140 by cable link 142 movement of either or both of release paddles 84 and 104 draws on yoke 80 and springs 76 and 78 attached thereto, expanding the i.d. of first outer coil spring 76 and second outer coil spring 78. The keyboard support platform may thus be pivoted about the horizontal axis defined by tube 70.

Advantageously, coil springs 76 and 78 have a lower spring constant than coil springs 176 and 178, so that, locking pivotal assembly 60 is released through partial activation of release paddles 84 and/or 104. Further activation of release paddles 84 and/or 104 additionally releases locking pivotal assembly 168. First coil spring 176 and second coil spring 178 are expanded, releasing the mechanism to pivot about the axis defined by tube 170.

Therefore, the user can choose to pivot only about the axis of first locking pivotal assembly 60, to essentially change the angle of the keyboard, without substantially changing the height of the keyboard. Upon further depression of release paddles 84 and/or 104 the user can select to adjust the relative height and angular orientation simultaneously.

As mentioned previously, either first release mechanism 62 or second release mechanism 64 can be used to release first locking pivotal assembly 60 or second locking pivotal assembly 168. Alternatively, both first release mechanism 62 and second release mechanism 64 can be activated simultaneously. When both are activated simultaneously, either need be activated only half the distance as if only one were being activated.

With keyboard 12 being pivotal about locking pivotal assembly 60 relative to support arm 14, and support arm 14 being pivotal about second locking pivotal assembly 168 relative to base unit 15 to which support device 10 is attached, the height and angular orientation of a keyboard positioned on support device 10 are adjusted easily. By grasping each side of keyboard support platform 12, and depressing one or both of release paddles 84 and 104, while simultaneously rotating and moving the keyboard to a comfortable position, both the elevation and angular orientation of a keyboard on support platform 12 can be adjusted simultaneously. Support platform 12 is then secured in the desired position merely by releasing depressed release paddles 84 and/or 104. Since the act of "locking" platform 12 can be performed while continuing to hold the platform in the desired position, firmly with both hands, it is unlikely that the position will move while platform 12 is being locked in position. This is of particular advantage over devices that require the turning of a knob or lever to secure the device in position.

Computer mouse platform 16 can be moved, within a limited range, to a comfortable position relative to a keyboard on keyboard support platform 12. Grasping either body 200 or arm 202, body 200 can be moved forward and back, up and down to the desire position.

Since keyboard support platform 10 can be adjusted quickly and easily, a user is encouraged by it's simplicity of operation to adjust it as necessary for comfort. When a keyboard thereon is not being used, support platform 12 can be stored out of the way, under the desk, table or the like to which it is attached, by simply grasping both sides of keyboard support platform 12, depressing on or both of first release mechanism 62 and second release mechanism 64, and pushing support platform 12 rearwardly. If necessary, computer mouse platform 16 can first be rotated about ball and socket joint 208 to a storage position beneath lower body piece 22.

Wrist rest unit 18 also is easily adjusted. Thumb wheel 228 can be rotated, thus turning shaft 218 and pinion gears 220 and 222. Racks 224 and 226 are thereby made to climb upwardly or downwardly on pinion gears 220 and 222, raising and lowering upper body 214. Without downward pressure on upper body 214, shaped head 236 can be caused to rotate in anti-rotation shroud 238. Slight downward pressure on upper body 214 causes anti-rotation shroud 238 to firmly engage shaped head 236, preventing downward creep of racks 224 and 226 on pinion gears 220 and 222.

Figure 8:
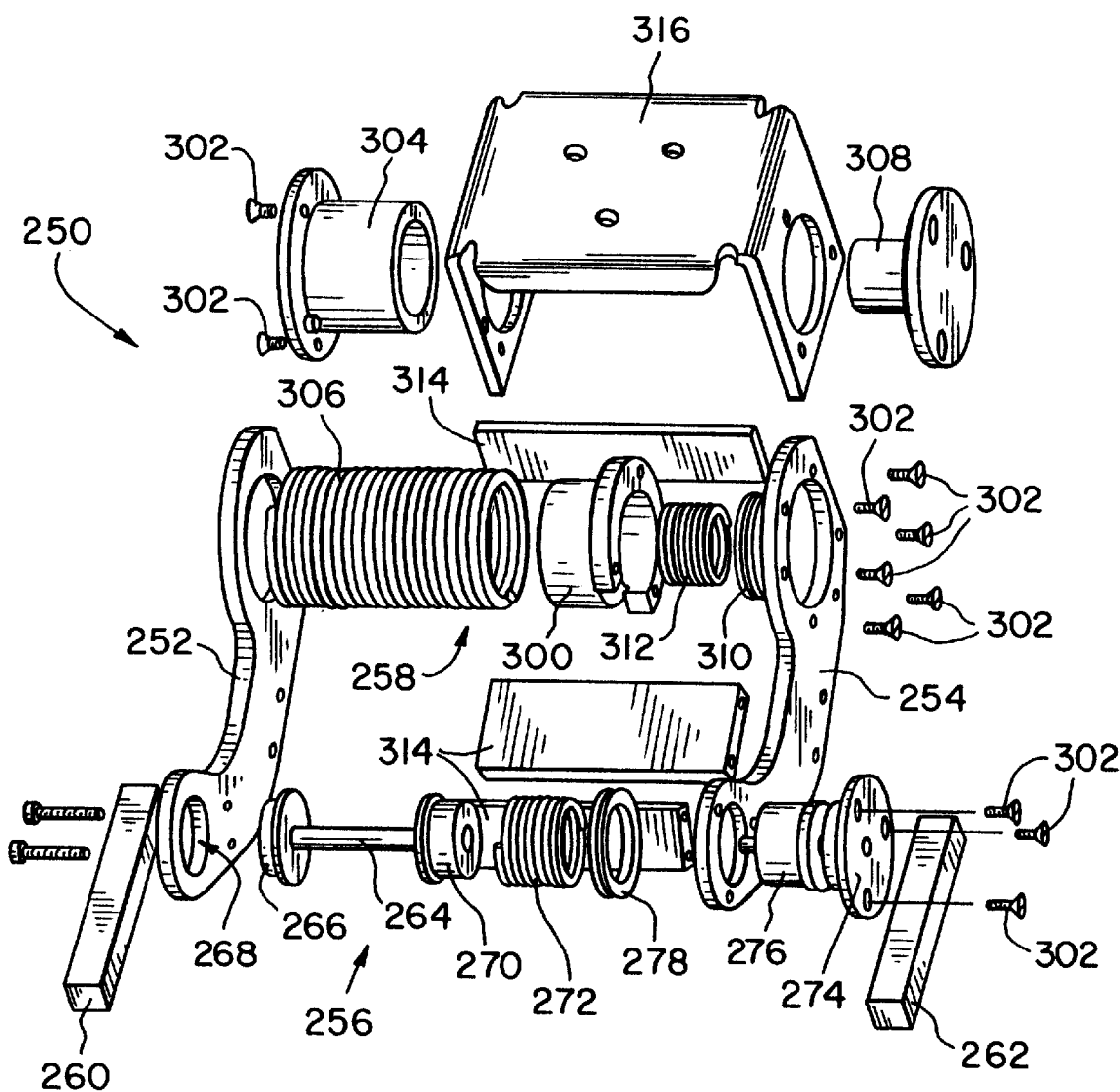
FIG. 8 in an exploded view of a modified embodiment for the support arm of the present invention.

With reference now to FIG. 8, the internal components of a modified support arm 250 are shown in an exploded view. Modified support arm 250 includes a first side bar 252 and a second side bar 254. A lower first locking pivotal assembly 256 and an upper second locking pivotal assembly 258 are disposed between first side bar 252 and second side bar 254, near the ends thereof. Attachment fingers 260 and 262 are provided at the lower ends of first side bar 252 and second side bar 254 for attaching modified support arm 250 to keyboard support platform 12.

Figure 9:
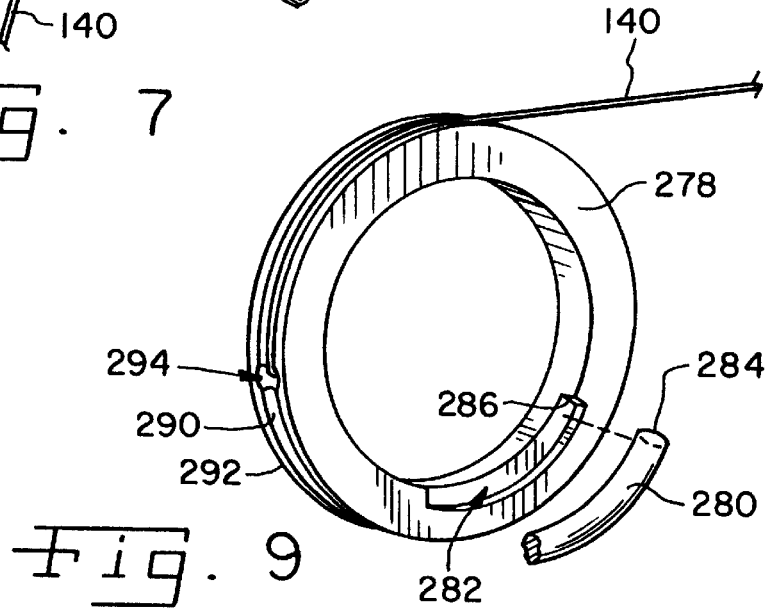
FIG. 9 is an enlarged perspective view of a toggle wheel, cable and spring assembly for the modified embodiment shown in FIG. 8.

Lower first locking assembly 256 includes a shaft 264 with a hub 266 disposed at one end thereof and rotationally received in an opening or hole 268 of first side arm 252. A hub 270 is disposed on the end of shaft 264 opposite the end of having hub 266. A first coil spring 272 is disposed on and attached to hub 270. A plug 274, secured by screws 302, extends through second side bar 254 and includes a hub portion 276. First coil spring 272 is disposed on hub portion 276 of plug 274. The internal diameter of first coil spring 272 is selected with respect to the outside diameter of hub portion 276 such that the i.d. of spring 272 is slightly less than the o.d. of hub 276, and spring 272 frictionally engages the outer surface of hub 276 in its relaxed position. A toggle wheel 278 of lower first locking pivotal assembly 256 is received on hub portion 276 of plug 274, and is connected to first coil spring 272. Toggle wheel 278 is shown enlarged in FIG. 9. An end 280 of first coil spring 272 rests in a chamfered edge section 282 of toggle wheel 278, with a tip 284 of spring 272 disposed against an abutment 286 on toggle wheel 278. Chamfered edge section 282 extends angularly downward from a side surface 288 of toggle wheel 278, terminating at abutment 286. A groove 290 is disposed circumferentially around outer edge 292 of toggle wheel 278. An end of cable 140 partially wraps toggle wheel 278, and is disposed in groove 290. Cable retainer 152 of cable 140 is received in a slot 294. Activation of release mechanism 62 and/or 64 rotates toggle wheel 278, releasing the frictional engagement of spring 272 on hub portion 276.

Upper second locking pivotal assembly 258 includes a hub 300 attached to the inner side of second side bar 254 by a plurality of screws 302. A hub 304 extends through first side bar 252, and is attached thereto by a further plurality of screws 302. A counterbalance spring 306 is disposed on hubs 300 and 304. A smaller hub 308 extends through second side bar 254, and has disposed thereon a second toggle wheel 310, similar to toggle wheel 278. A coil spring 312 is connected to toggle wheel 310 and frictionally engages smaller hub 308. The end of cable 140 opposite the end connected to toggle wheel 278 partially surrounds and is connected to toggle wheel 310.

Modified support arm 250 further includes a plurality of spacers 314 disposed between first side bar 252 and second side bar 254. A bracket 316 is disposed between the upper ends of first side bar 252 and second side bar 254. Housings surrounding the mechanism shown in FIG. 8 are not shown.

Operation of modified support arm 250 is similar to that described previously for the first embodiment of the present invention. One or both of release mechanisms 62 and 64 are activated to rotate toggle wheels 278 and 310, unsecuring the frictional engagement of coil springs 272 and 312.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A keyboard support device for a base structure, comprising:
   a keyboard support platform adapted for receiving a keyboard thereon;
   a support arm having a first end adapted for pivotally attaching said support arm to said keyboard support platform, and a second end adapted for pivotally attaching said support arm relative to the base structure, said support arm including a fixed member associated with said first end thereof;
   a locking pivotal assembly including a coil spring located upon said fixed member, said coil spring having a locked position for frictionally engaging said fixed member and thereby restricting pivotal movement of said keyboard support platform relative to the base structure, and an unlocked position for disengaging said fixed member and thereby permitting pivotal movement of said keyboard support platform relative to the base structure; and
   a release mechanism operable to adjust said coil spring from said locked position to said unlocked position.

2. The keyboard support device of claim 1, further comprising:
   a tube defining an axis about which said keyboard support platform is pivotal relative to the base structure, said tube having an outside diameter;
   said coil spring being disposed around said tube, said coil spring having an inside diameter, said inside diameter of said coil spring in a relaxed condition being less than said outside diameter of said tube;
   a first end of said coil spring being attached to said tube; and
   a second end of said coil spring being connected to said release mechanism.

3. The keyboard support device of claim 2, Wherein a counterbalancing spring is disposed in and connected to said first tube.

4. The keyboard support device of claim 1, further comprising a wrist support unit connected to said keyboard support platform, said wrist support unit having a vertically adjustable upper piece, and a rack and pinion adjustment mechanism operatively connected to said upper piece.

5. The keyboard support device of claim 1, further comprising a peripheral component platform, and a peripheral component platform support arm connected between said keyboard support platform and said peripheral component platform.

6. A keyboard support device for a base structure, comprising:
a keyboard support platform adapted for receiving a keyboard thereon;
a support arm having a first end adapted for pivotally attaching said support arm to said keyboard support platform, and a second end adapted for pivotally attaching said support arm relative to the base structure;
a locking pivotal assembly including a coil spring having a locked position for restricting pivotal movement of said keyboard support platform relative to the base structure, and an unlocked position permitting pivotal movement of said keyboard support platform relative to the base structure;
a release mechanism operable to adjust said coil spring from said locked position to said unlocked position; and
a first locking pivotal assembly at said first end of said support arm, said first locking pivotal assembly including a first coil spring having a first locked position for restricting pivotal movement of said keyboard support platform relative to said support arm, and a first unlocked position permitting pivotal movement of said keyboard support platform relative to said support arm;
a second locking pivotal assembly at said second end of said support arm, said second locking pivotal assembly including a second coil spring having a second locked position for restricting pivotal movement of said support arm relative to the base structure, and a second unlocked position permitting pivotal movement of said support arm relative to the base structure;
a release mechanism operable to adjust said first coil spring from said first locked position to said first unlocked position; and operable to adjust said second coil spring from said second locked position to said second unlocked position.

7. The keyboard support device of claim 6, wherein:
said first locking pivotal assembly includes a first tube defining a first axis about which said keyboard support platform is pivotal relative to the base structure, said first coil spring is disposed around said first tube, an internal diameter of said first coil spring in a relaxed condition is less than an outside diameter of said first tube, a first end of said first coil spring is attached to said first tube; and a second end of said first coil spring is connected to said release mechanism; and
said second pivotal locking assembly includes a second tube defining a second axis about which said keyboard support platform is pivotal relative to the base structure, said second coil spring is disposed around said second tube, an internal diameter of said second coil spring in a relaxed condition is less than an outside diameter of said second tube, a first end of said second coil spring is attached to said second tube; and a second end of said second coil spring is connected to said release mechanism.

8. The keyboard support device of claim 7, wherein a counterbalancing spring is disposed in and connected to at least one of said first tube and said second tube.

9. The keyboard support device of claim 7, wherein said first coil spring has a first spring constant, and said second coil spring has a second spring constant, said second spring constant being greater than said first spring constant.

10. The keyboard support device of claim 7, further comprising a peripheral component platform, and a peripheral component platform support arm connected between said keyboard support platform and said peripheral component platform.

11. The keyboard support device of claim 7, further comprising a wrist support unit connected to said keyboard support platform, said wrist support unit having a vertically adjustable upper piece, and a rack and pinion adjustment mechanism operatively connected to said upper piece.

12. The keyboard support device of claim 11, further comprising first and second racks attached to said adjustable upper piece, a lower piece, a shaft disposed for rotation in said lower piece, and first and second pinion gears disposed on said shaft and operatively engaged with said first and second racks.

13. The keyboard support device of claim 12, further comprising a thumbwheel disposed on said shaft.

14. A keyboard support device for a base structure, comprising:
a keyboard support platform adapted for receiving a keyboard thereon;
a support arm having a first end adapted for pivotally attaching said support arm to said keyboard support platform, and a second end adapted for pivotally attaching said support arm relative to the base structure;
a locking pivotal assembly including a coil spring having a locked position for restricting pivotal movement of said keyboard support platform relative to the base structure, and an unlocked position permitting pivotal movement of said keyboard support platform relative to the base structure;
a release mechanism operable to adjust said coil spring from said locked position to said unlocked position;
a wrist support unit connected to said keyboard support platform, said wrist support unit having a vertically adjustable upper piece, and a rack and pinion adjustment mechanism operatively connected to said upper piece; and
first and second racks attached to said adjustable upper piece, a lower piece, a shaft disposed for rotation in said lower piece, and first and second pinion gears disposed on said shaft and operatively engaged with said first and second racks.

15. The keyboard support device of claim 14, further comprising a thumbwheel disposed on said shaft.

16. A locking pivotal link between a keyboard support platform and a base unit, comprising:
a pivotal joint between the keyboard support platform and the base unit, including a cylindrical element having an outside surface, said cylindrical element rotatably interconnecting the keyboard support platform relative to the base unit;
a coil spring disposed around said cylindrical element, said coil spring having a diameter sized for creating an interference fit between said coil spring and said cylindrical element;
said coil spring having a first end and a second end, said first end being fixed in position relative to said cylindrical element; and
a release mechanism connected to said second end, said release mechanism adapted for movement of said second end to change said diameter and relieve the interference fit between said coil spring and said cylindrical element, said release mechanism including a first release paddle and a second release paddle, a first cable and pulley system disposed between said first release paddle and said second release paddle, and a cable connection between said first cable and pulley system and said second end.

17. The locking pivotal link defined in claim 16, further comprising a first bar, a second bar spaced from said first bar, and said cylindrical element being attached to said second bar and extending therefrom toward said first bar.

18. A locking pivotal link between a keyboard support platform and a base unit, comprising:

a pivotal joint between the keyboard support platform and the base unit, including a cylindrical element having an outside surface, said cylindrical element rotatably interconnecting the keyboard support platform relative to the base unit;

a coil spring disposed around said cylindrical element, said coil spring having a diameter sized for creating an interference fit between said coil spring and said cylindrical element;

said coil spring having a first end and a second end, said first end being fixed in position relative to said cylindrical element;

a release mechanism connected to said second end, said release mechanism adapted for movement of said second end to change said diameter and relieve the interference fit between said coil spring and said cylindrical element; and a counterbalancing spring connected to said cylindrical element.

19. The locking pivotal link defined in claim 18, wherein said cylindrical element is a tube, and said counterbalancing spring is disposed in said tube.

20. A keyboard support device comprising:

a keyboard support platform;

a wrist rest mechanism attached to said keyboard support platform, and including a body having an upper body portion and a lower body portion, said upper body portion being vertically adjustable relative to said lower body portion;

an adjustment mechanism including a first and second rack and a first and second pinion gear for adjusting the position of said upper body portion relative to said lower body portion; and a shaft journaled for rotation in said lower body portion; said first and second pinion gears carried by said shaft; and said first and second racks connected to said upper body portion and adapted and arranged for engagement with said first and second pinion gears.

21. The keyboard support device of claim 20, further comprising a thumbwheel disposed on said shaft and operable to rotate said shaft.

22. A keyboard support device comprising:

a keyboard support platform;

a wrist rest mechanism attached to said keyboard support platform, and including a body having an upper body portion and a lower body portion, said upper body portion being vertically adjustable relative to said lower body portion; and an adjustment mechanism including a rack and a pinion gear for adjusting the position of said upper body portion relative to said lower body portion, said rack being attached to said upper body portion, said pinion gear being connected to said lower body portion.

23. A keyboard support device comprising:

a keyboard support platform;

a wrist rest mechanism attached to said keyboard support platform, and including a body having an upper body portion and a lower body portion, said upper body portion being vertically adjustable relative to said lower body portion, supports being disposed on said lower body portion, a shaft being journaled for rotation in said supports; and an adjustment mechanism including a rack and a pinion gear for adjusting the position of said upper body portion relative to said lower body portion, said pinion gear being disposed on said shaft, for rotation with said shaft.

24. The keyboard support device of claim 23, further comprising a thumb wheel disposed on said shaft and extending through an opening in said lower body portion.

25. The keyboard support device of claim 23, further comprising a shaped head disposed on said shaft; a locking shroud disposed in said upper body portion for securing a position for said pinion gear.

26. A keyboard support device comprising:

a keyboard support platform;

a wrist rest mechanism attached to said keyboard support platform, and including a body having an upper body portion and a lower body portion, said upper body portion being vertically adjustable relative to said lower body portion; and an adjustment mechanism including a vertically aligned rack and a pinion gear for adjusting the vertical position of said upper body portion, said rack having a longitudinal axis, said longitudinal axis of said rack being substantially perpendicular to said keyboard support platform relative to said lower body portion.

* * * * *